United States Patent
Qian et al.

(10) Patent No.: US 11,393,170 B2
(45) Date of Patent: Jul. 19, 2022

(54) PRESENTATION OF CONTENT BASED ON ATTENTION CENTER OF USER

(71) Applicant: Lenovo (Singapore) Pte. Ltd., Singapore OT (SG)

(72) Inventors: Ming Qian, Cary, NC (US); Song Wang, Cary, NC (US); Jun-Ki Min, Chicago, IL (US); Krishna C. Garikipati, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/107,576

(22) Filed: Aug. 21, 2018

(65) Prior Publication Data
US 2020/0066041 A1  Feb. 27, 2020

(51) Int. Cl.
| | | |
|---|---|---|
| *G06T 19/00* | (2011.01) | |
| *G06F 3/01* | (2006.01) | |
| *G02B 27/01* | (2006.01) | |
| *G06T 7/73* | (2017.01) | |
| *G06V 40/20* | (2022.01) | |
| *G06V 40/10* | (2022.01) | |

(52) U.S. Cl.
CPC ........ *G06T 19/006* (2013.01); *G02B 27/0172* (2013.01); *G06F 3/013* (2013.01); *G06T 7/73* (2017.01); *G06V 40/107* (2022.01); *G06V 40/28* (2022.01)

(58) Field of Classification Search
None
See application file for complete search history.

(56) References Cited

U.S. PATENT DOCUMENTS

| | | |
|---|---|---|
| 7,576,725 B2 | 8/2009 | Bathiche et al. |
| 8,098,171 B1 | 1/2012 | Szczerba et al. |
| 8,164,543 B2 | 4/2012 | Seder et al. |
| 8,547,298 B2 | 10/2013 | Szczerba et al. |
| 8,922,588 B2 | 12/2014 | Makino et al. |
| 9,292,974 B2 | 3/2016 | Kaino et al. |
| 9,734,634 B1 | 8/2017 | Mott et al. |
| 10,133,342 B2 | 11/2018 | Mittal et al. |
| 10,347,002 B2 | 7/2019 | Dai et al. |
| 10,460,139 B1 | 10/2019 | Gabriel |

(Continued)

FOREIGN PATENT DOCUMENTS

| | | |
|---|---|---|
| EP | 2889718 A1 | 7/2015 |
| EP | 3179292 A1 | 6/2017 |

OTHER PUBLICATIONS

Adam, Jos J., Bovend'eerdt, Thamar J.H., Van Dooren, Fleur E.P., Fischer, Martin H., Pratt, Jay, "The closer the better: Hand proximity dynamically affects letter recognition accuracy", Attention, Perception, & Psychophysics, Oct. 2012, vol. 74, Issue 7, pp. 1533-1538. Retrieved from https://link.springer.com/article/10.3758/s13414-012-0339-3#citeas.

(Continued)

*Primary Examiner* — Hilina K Demeter
(74) *Attorney, Agent, or Firm* — John M. Rogitz; John L. Rogitz

(57) ABSTRACT

In one aspect, a device includes at least one processor and storage accessible to the at least one processor. The storage comprises instructions executable by the at least one processor to determine an attention center that corresponds to at least a portion of a real-world environment and present, on a display, content at a display location determined based on the attention center.

20 Claims, 9 Drawing Sheets

(56) References Cited

U.S. PATENT DOCUMENTS

| | | | |
|---|---|---|---|
| 10,643,362 | B2 | 5/2020 | VanBlon et al. |
| 10,732,826 | B2* | 8/2020 | Klein .................. G06F 3/011 |
| 2008/0158096 | A1 | 7/2008 | Breed |
| 2008/0235724 | A1 | 9/2008 | Sassenscheidt et al. |
| 2009/0109240 | A1 | 4/2009 | Englert et al. |
| 2009/0189974 | A1 | 7/2009 | Deering |
| 2010/0079356 | A1 | 4/2010 | Hoellwarth |
| 2010/0287511 | A1 | 11/2010 | Meier et al. |
| 2011/0138416 | A1 | 6/2011 | Kang et al. |
| 2011/0209099 | A1 | 8/2011 | Hinckley et al. |
| 2012/0075463 | A1 | 3/2012 | Chen et al. |
| 2012/0117514 | A1 | 5/2012 | Kim et al. |
| 2013/0079627 | A1 | 3/2013 | Lee |
| 2013/0267838 | A1 | 10/2013 | Fronk et al. |
| 2014/0168056 | A1 | 6/2014 | Swaminathan et al. |
| 2014/0184496 | A1* | 7/2014 | Gribetz ............... G06F 3/04842 345/156 |
| 2015/0138223 | A1 | 5/2015 | Hornung et al. |
| 2015/0179147 | A1 | 6/2015 | Rezaiifar et al. |
| 2015/0205358 | A1 | 7/2015 | Lyren |
| 2015/0253862 | A1 | 9/2015 | Seo et al. |
| 2015/0258431 | A1 | 9/2015 | Stafford et al. |
| 2015/0302649 | A1 | 10/2015 | Komatsu |
| 2015/0317518 | A1 | 11/2015 | Fujimaki et al. |
| 2016/0041614 | A1 | 2/2016 | Mok et al. |
| 2016/0049013 | A1 | 2/2016 | Bautista |
| 2016/0109957 | A1 | 4/2016 | Takashima |
| 2016/0189434 | A1 | 6/2016 | Fong |
| 2016/0253844 | A1 | 9/2016 | Petrovskaya et al. |
| 2016/0257199 | A1 | 9/2016 | Bark et al. |
| 2016/0299569 | A1 | 10/2016 | Fisher et al. |
| 2016/0350601 | A1 | 12/2016 | Grauer et al. |
| 2016/0379412 | A1 | 12/2016 | Butler et al. |
| 2017/0053444 | A1 | 2/2017 | Huang et al. |
| 2017/0068380 | A1* | 3/2017 | Hong .................. G11B 27/036 |
| 2017/0161950 | A1 | 6/2017 | Seder et al. |
| 2017/0162177 | A1 | 6/2017 | Lebeck et al. |
| 2017/0168566 | A1* | 6/2017 | Osterhout ............ G06F 3/0227 |
| 2017/0323485 | A1 | 11/2017 | Samec et al. |
| 2017/0343811 | A1 | 11/2017 | Mese et al. |
| 2018/0005406 | A1 | 1/2018 | Dai et al. |
| 2018/0075658 | A1* | 3/2018 | Lanier ................. G06T 11/001 |
| 2018/0088185 | A1 | 3/2018 | Woods et al. |
| 2018/0101989 | A1 | 4/2018 | Frueh et al. |
| 2018/0158250 | A1* | 6/2018 | Yamamoto ........... G06F 3/017 |
| 2018/0239144 | A1 | 8/2018 | Woods et al. |
| 2018/0350150 | A1 | 12/2018 | Powderly et al. |
| 2018/0365855 | A1 | 12/2018 | Laurent et al. |
| 2018/0365897 | A1* | 12/2018 | Pahud .................. G06F 3/1454 |
| 2019/0217202 | A1 | 7/2019 | Komori et al. |
| 2019/0236842 | A1* | 8/2019 | Bennett ............... G06T 17/20 |
| 2019/0261957 | A1 | 8/2019 | Zaslavsky et al. |
| 2019/0270022 | A1 | 9/2019 | Magpuri et al. |
| 2019/0272674 | A1* | 9/2019 | Comer ................. H04L 51/18 |
| 2019/0295298 | A1* | 9/2019 | VanBlon ............. G06F 3/0481 |
| 2019/0295320 | A1* | 9/2019 | Ghatak ................ G06F 3/011 |
| 2019/0336864 | A1 | 11/2019 | Magpuri et al. |
| 2019/0340821 | A1* | 11/2019 | Chen ................... G06F 3/04815 |

OTHER PUBLICATIONS

Festman, Y, Adam, JJ, Pratt, J, Fischer, MH. "Both hand position and movement direction modulate visual attention". Frontiers in Psychology. 2013; 4:657. Retrieved from https://www.ncbi.nlm.nih.gov/pmc/articles/PMC3787593/.

Rachel Metz, "How to Avoid Real Objects While in a Virtual World", Jun. 12, 2015, https://www.technologyreview.com/s/538336/how-to-avoid-real-objects-while-in-a-virtual-world/.

Reed, C. L., Betz, R., Garza, J., & Roberts, R. (2010) Grab it! Biased attention for functional hand and tool space. Attention, Perception, & Psychophysics, 72, 236-245.

Reed, C. L., Grubb, J. D., & Steele, C. (2006). Hands up: Attentional prioritization of space near the hand. Journal of Experimental Psychology. Human Perception and Performance, 32, 166-177, Abstract. Retrieved from https://www.ncbi.nlm.nih.gov/pubmed/16478334.

Rosenbaum, D. (2017). Knowing Hands. In Knowing Hands: The Cognitive Psychology of Manual Control (Book Description) Cambridge: Cambridge University Press. Retrieved from https://www.cambridge.org/core/books/knowing-nands/4F1226345954CA41775024100371B971#fndtn-information.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", file history of related U.S. Appl. No. 15/660,176, filed Jul. 26, 2017.

Ming Qian, John Weldon Nicholson, Song Wang, Jatinder Kumar, David Alexander Schwarz, "Presentation of Augmented Reality Images at Display Locations That Do Not Obstruct User's View", file history of related U.S. Appl. No. 16/018,351, filed Jun. 26, 2018.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related pending U.S. Appl. No. 15/660,176, Applicant's response to non-final office action filed Oct. 11, 2018.

Qian et al., "Presentation of Augmented Reality Images at Display Locations that Do Not Obstruct User's View", related U.S. Appl. No. 16/018,351, Non-Final Office Action dated Sep. 19, 2019.

Qian et al., "Presentation of Augmented Reality Images at Display Locations that Do Not Obstruct User's View", related U.S. Appl. No. 16/018,351, Applicant's response to Non-Final Office Action filed Dec. 18, 2019.

Qian et al., "Presentation of Augmented Reality Images at Display Locations that Do Not Obstruct User's View", related U.S. Appl. No. 16/018,351, Final Office Action dated Mar. 16, 2020.

Qian et al., "Presentation of Augmented Reality Images at Display Locations that Do Not Obstruct User's View", related U.S. Appl. No. 16/018,351, Applicant's response to Final Office Action filed Jul. 1, 2020.

Qian et al., "Presentation of Augmented Reality Images at Display Locations that Do Not Obstruct User's View", related U.S. Appl. No. 16/018,351, Non-Final Office Action dated Oct. 27, 2020.

Qian et al., "Presentation of Augmented Reality Images at Display Locations that Do Not Obstruct User's View", related U.S. Appl. No. 16/018,351,Non-Final Office Action dated Oct. 6, 2020.

Qian et al., "Presentation of Augmented Reality Images at Display Locations that Do Not Obstruct User's View", related U.S. Appl. No. 16/018,351, Applicant's response to Non-Final Office Action filed.Dec. 9, 2020.

Vanblon et al., "Message Location Based On Limb Location", file history of related U.S. Appl. No. 15/935,546, filed May 26, 2018.

* cited by examiner

STAGE 1: A HOLDS MILK

STAGE 2: A GIVES MILK TO B

STAGE 3: B IS POURING MILK

SETTINGS

- ENABLE CONTENT PRESENTATION BASED ON ATTENTION CENTER ~1402

USE :

- HAND POSITION/MOVEMENT ~1404
- NOSE/HEAD ORIENTATION ~1406
- EYE POSITION/GAZE ~1408
- POSITION OF OBJECT TO BE TOUCHED/ENGAGED ~1410
- RELEVANCE OR ASSIGNED ROLE(S)/TASK(S) ~1412
  - CURRENTLY SET AS DOCTOR ROLE ~1414

[ SELECT DIFFERENT ROLE ] ~1416

FIG. 14

PRESENTATION OF CONTENT BASED ON ATTENTION CENTER OF USER

BACKGROUND

Augmented reality (AR) headsets, so-called "smart" glasses and other types of electronic devices are becoming increasingly prevalent in today's technology marketplace. However, as recognized herein, current devices often present content at a display location that is inconvenient for viewing by a user given what the user might be looking at in the real-world or what is likely to draw the user's attention. Hence, as recognized herein, current electronic devices do not present content at display locations that allow for quick and/or easy detection and viewing of the content on the part of the user. There are currently no adequate solutions to the foregoing computer-related, technological problem.

SUMMARY

Accordingly, in one aspect a device includes at least one processor, at least one display accessible to the at least one processor, and storage accessible to the at least one processor. The storage includes instructions executable by the at least one processor to identify at least one of an orientation of at least one body part of a user and a location of at least one body part of the user. The instructions are also executable to present content on the at least one display at a display location determined based on the identification.

In another aspect, a method includes determining, using an electronic device, an attention center for a user that corresponds to at least a portion of a real-world environment and presenting, on a display, content at a display location determined based on the attention center for the user.

In still another aspect, a computer readable storage medium that is not a transitory signal includes instructions executable by at least one processor to determine an attention center that corresponds to at least a portion of a real-world environment. The instructions are also executable to present, on a display, content at a display location determined based on the attention center.

The details of present principles, both as to their structure and operation, can best be understood in reference to the accompanying drawings, in which like reference numerals refer to like parts, and in which:

BRIEF DESCRIPTION OF THE DRAWINGS

FIG. 14 shows an example graphical user interface (GUI) in accordance with present principles.

DETAILED DESCRIPTION

Figure 1:
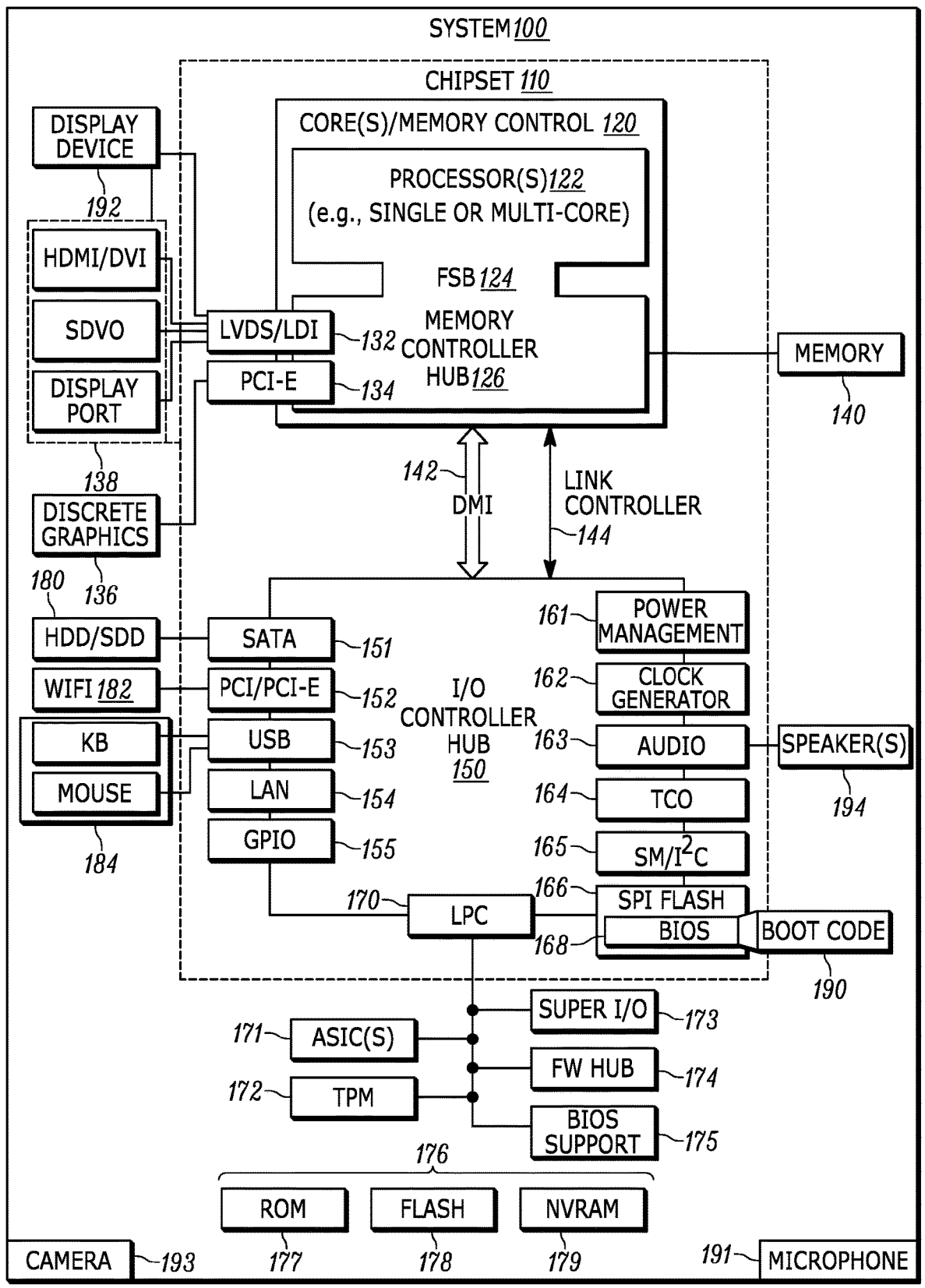
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that may provide input from the microphone to the processor 122 based on audio that is detected, such as via a user providing audible input to the microphone. The system may also include one or more cameras 193 that may gather one or more images and provide them and related input to the processor 122. The camera(s) 193 may be a thermal imaging camera, a digital camera such as a webcam, an infrared (IR) camera, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
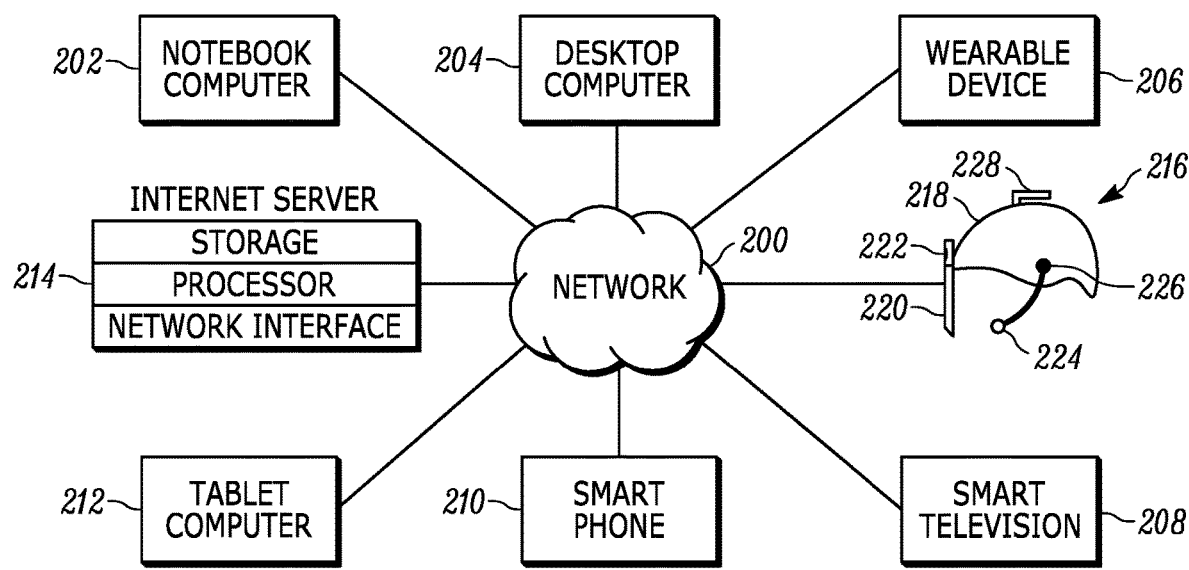
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be an augmented reality (AR) headset in some examples, while it may be Internet-enabled computerized glasses in other examples. Still other types of headsets may be used to present content and perform other operations as disclosed herein, such as a mixed reality (MR) headset or a virtual reality (VR) headset that may present a camera feed of the user's real-world environment on its display so that content can be overlaid on a portion of the camera feed.

The headset 216 may include a housing 218 to which a display 220 is coupled for presenting content in accordance with present principles. In AR scenarios, the display 220 may be an at least partially transparent display such as a "heads-up" display and may permit a wearer of the headset to view real-world objects through it while wearing the headset 216, while also being configured to present content on the display 220 itself such AR images/graphics, etc.

The headset 216 may also include plural cameras 222 that may each be similar in function and configuration to the camera 193 described above, with at least one of the cameras 222 oriented to image a wearer's eyes while the user wears the headset 216. The images may then be processed using eye tracking software for, e.g., infrared (IR) eye tracking.

Another one of the cameras 222 may be oriented away from the headset 216 to image the user's environment according to a field of view of the user and to also help identify the location of one or both hands of the user while the user wears the headset 216, though cameras at other locations within the user's environment that are still in communication with the headset 216 may also be used for identifying the location of one or both hands. In any case, the camera(s) oriented away from the headset 216 to image the user's environment may be juxtaposed on the bridge of the headset 216 that extends between a user's eyes and over the user's nose while wearing the headset 216, or at another location on the headset 216.

The headset 216 may also include a microphone 224 that may be similar in function and configuration to the microphone 191 for receiving voice input, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, as well as a processor, storage, a battery pack or other power source, etc.

Before describing the remaining figures, it is to be understood in accordance with present principles that content as referenced herein may include many different types of content, whether related to a given action of a user as described below or not. For instance, the content may be a new email notification, incoming call notification, or new text message notification. The content may also include an email or text message itself, as well as a stored video file, Internet content presented via an Internet browser, social networking content, etc. AR and VR objects in particular may also be presented, such as avatars of people within a user's field of view or AR/VR objects that may be interacted with virtually.

Figure 3:
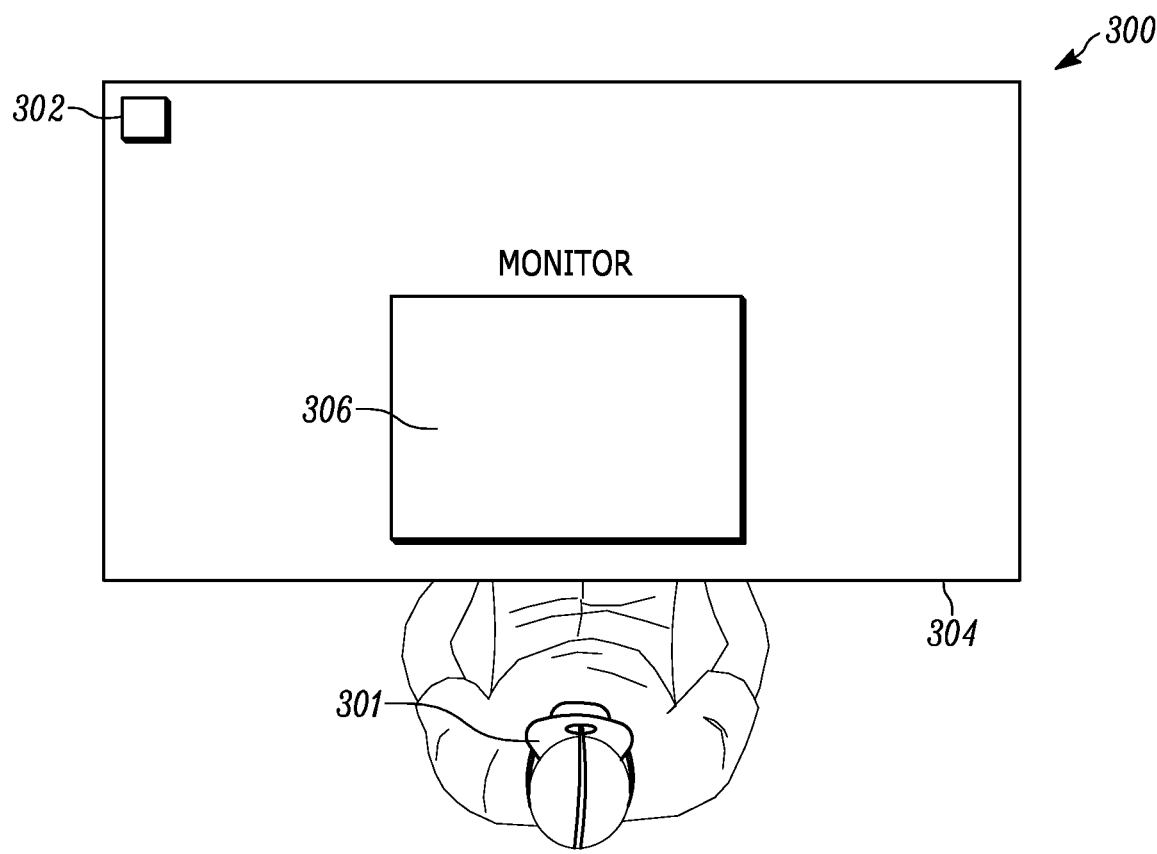
FIGS. 3, 4, 6-8, and 10-12 are example illustrations in accordance with present principles.

Now referring to FIG. 3, it shows an example illustration 300 in accordance with present principles. The illustration 300 pertains to an embodiment in which content may be presented at a user's attention center as determined based on a hand position(s) of the user 301. In other words, the location of one or more of the user's hands may establish the attention center. This may be done in part because, as recognized herein, a user's attention may be more easily drawn to a location at or near the user's hand position(s) than to other locations not at or near the user's hand position(s).

Thus, a sensor 302 may detect a location of one or both hands of the user 301, with the sensor being one or more of a camera(s), a capacitive touch sensor, an infrared proximity sensor, etc. If a camera is used, object recognition and spatial analysis may be used to determine the current location of the user's hands, e.g., relative to known points within the user's environment. If a touch or proximity sensor is used, a portion of the user's body sensed as being proximate to the hand-held display 304 (also shown in FIG. 3) or sensed as contacting the display may be assumed to be part of the user's hands. In the example shown, the user's hands are detected as touching the display 304 on an underside of the display.

Based on identifying the location or proximity of one or more of the user's hands, content 306 may then be presented adjacent to the location(s). In the example shown in FIG. 3, two hands are detected as being proximate to the display 304 (on an underside of the display 304), and accordingly the content 306 may be centered on the display 304 at X and Y coordinates, relative to the plane established by the top surface of the display 304, that are equidistant from X and Y coordinates of a certain portion of the two hands, such as a center point of each hand or the point most-proximate to the other respective hand such as a certain the tip of a certain finger.

However, in other cases such as when only one hand is detected or when both hands are detected as being more than a threshold non-zero distance apart from each other, the content 306 may be presented so that a closest edge of the content 306 to a selected hand is no more than a threshold non-zero distance away from the location of the selected hand (e.g., center point of the hand or portion of the hand furthest from any edge of the display 304) but not at the location of the selected hand.

The threshold distance may be in terms of X and Y coordinates of the hand relative to the plane established by the top surface of the hand-held display 304. So, for example, if the user had only one hand supporting the display 304 at a location underneath the display 304, the threshold distance may be three centimeters from a point or area on the display 304 having X, Y coordinates relative to the plane established by the display 304 that are the same as the X, Y coordinates for the hand even if the hand's Z coordinates are different since it is underneath the display 304 rather than coplanar with its top surface.

Additionally, as mentioned above one hand may be selected if two hands are detected but are determined to be more than a threshold non-zero distance apart from each other. The selection may be made based on which hand is more centrally located on the display 304 in X and Y coordinates than the other hand, based on which hand is more proximate to the torso or head of the user, based on which hand is disposed more toward any edge of the display 304 in X and Y coordinates than the other hand, based on one of the hands having less content or windows already presented near it than the other hand, or based on a default setting to present content adjacent to the user's dominant hand (which will typically be the right hand).

The foregoing principles described in relation to FIG. 3 may also apply to embodiments where the user 301 is wearing a headset and the display on which the content 306 is presented is the headset's transparent display. In such an instance, the content 306 may be presented using AR or VR software so that the content 306 appears to the user to be located in three dimensions in the real-world at a location in X, Y, and even Z coordinates within a threshold non-zero distance of one or both hands within the user's field of view while the user wears the headset, but still not at a location appearing to overlap any of either hand. The content 306 may also be presented so that the content 306 appears to be equidistant to both hands if both hands are within the user's field of view through the headset, so that the content 306 appears adjacent to a hand within the user's field of view that has no or less content presented adjacent to it than the other hand also within the field of view, so that the content 306 appears adjacent to a hand that is more proximate to the torso or head of the user than the other hand, or based on a default setting to present content adjacent to the user's dominant hand. In any case, the content may be presented on the display of the headset at a display location adjacent to where the user's line of sight to the selected hand would intersect the display should the user attempt to look at the selected hand using the display (in a VR embodiment) or through the display (in an AR embodiment) even if the user is not currently doing so.

Figure 4:
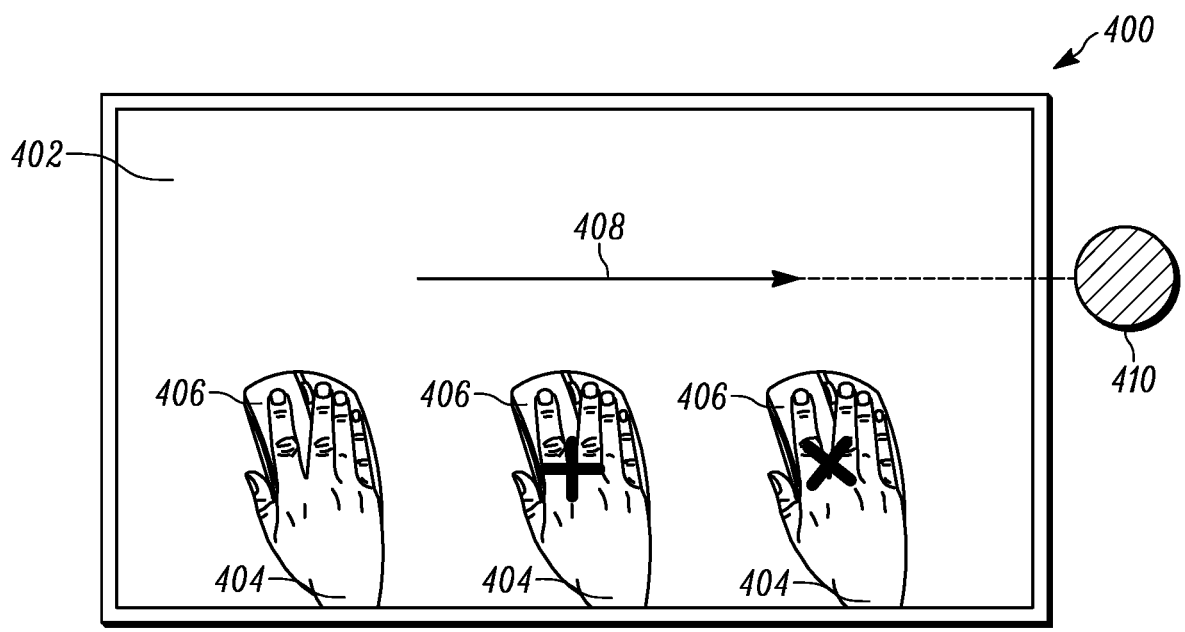

Reference is now made to FIG. 4, which shows another example illustration 400 in accordance with present principles. It is to be understood that FIG. 4 shows the perspective of a user while wearing a headset, with the illustration 400 showing a mouse pad 402 and a hand 404 of the user progressively moving a mouse 406 across the pad 402 as indicated by arrow 408.

Based on identification of the trajectory of the hand 404, content 410 may be presented on the headset's at least partially transparent display using AR or VR software so that it appears to be at a location that is a threshold non-zero distance away from a current location of the hand 404 (at the time of the content presentation) in the direction of movement, with the hand 404 being the attention center in this example. This may be done by presenting the content 410 on the display of the headset at a display location that is in the direction of movement in at least two of three dimensions relative to the current head orientation of the user. Even in a handset embodiment where the display is instead a display of, e.g., a smart phone, the content may similarly be presented at a display location that is in a display direction, relative to the user's head and in two dimensions, of the movement of the hand 404 relative to the current location of the hand.

As for identifying the trajectory of the hand 404, again camera input from a camera such as one on the headset (or even touch sensor input, proximity sensor input, or still other types of sensor input) may be used by mapping the hand 404 as it moves to identify the direction of movement. The content 410 itself may be presented in three dimensional form using AR or VR software so that it appears to be in the direction of movement in all three dimensions, or so that it appears to be in the direction of movement in up/down and right/left directions relative to the perspective of the user even if not presented to appear at a certain depth in the direction of movement.

Figure 5:
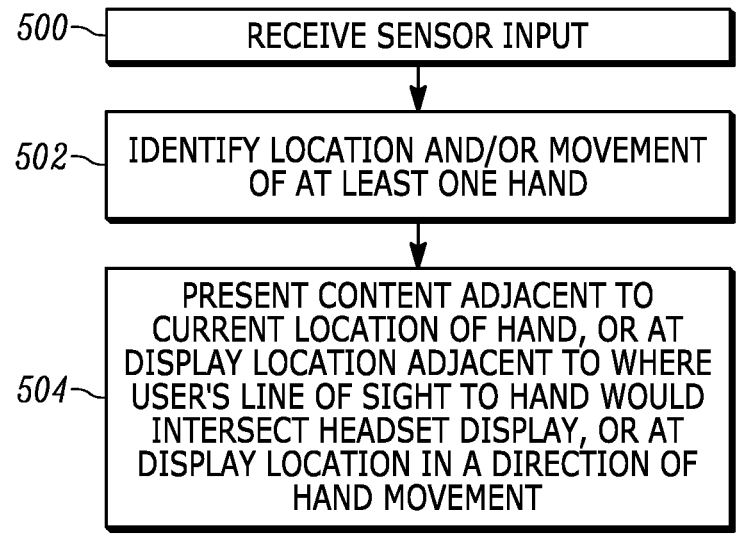
FIGS. 5, 9, and 13 show flow charts of example algorithms in accordance with present principles.

FIG. 5 shows example logic that may be executed by a device in accordance with the embodiments of FIGS. 3 and 4 described above. Note that while FIG. 5 illustrates the logic in flow chart format, state logic or other equivalent logic may be used. In any case, the logic of FIG. 5 starts at block 500 where the device may receive input from a sensor, such as a camera or touch sensor. From block 500 the logic may then proceed to block 502 where the device may identify the location(s) and/or movement(s) of one or more of a user's hands as described above.

Thereafter, the logic may move from block 502 to block 504. At block 504 the device may present content adjacent to a current location of one or more hands as described above or, in AR or VR embodiments, adjacent to where the user's line of sight to the hand(s) would intersect the headset's display should the user attempt to look at the hand as described above. In other embodiments the content may be presented at a display location in a direction of movement of one or more hands as described above.

Figure 6:
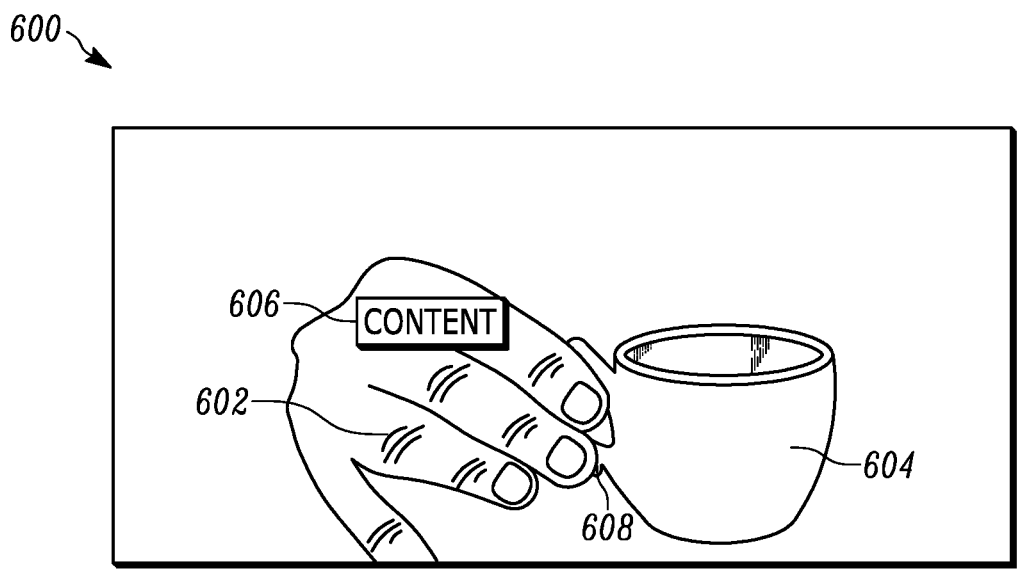

Continuing the detailed description in reference to FIG. 6, it shows another example illustration 600 in accordance with present principles. As shown, the hand 602 of a user is shown as physically engaging a coffee cup 604 by lifting the cup 604 with the hand 602. Depending on which type of device the user is using—either a handset in the user's other hand or a headset on the user's head—a camera on the device may gather images of the user's real-world environment, and then identify the cup 604 as being held by the hand 602 using object recognition software to subsequently present content 606 on the handset display or headset display adjacent to the display location where the user physically engaging the cup 604 can be seen. In this example, the user is shown as physically engaging the cup 604 at a handle 608, and so the content 606 is illustrated as being presented above the handle 608 of the cup 604, within a threshold non-zero distance of the cup 604, based on the handle 608 being the attention center in this example.

In some embodiments, presentation of the content 606 adjacent to the handle 608 may be done not just based on identification of the handle 608 being the portion of the cup 604 affording user action such as being physically engaged by the hand 602, but also based on identification of the user as looking at the handle 608 specifically. This may be determined by analyzing images from a camera that collects images of the user's eyes using eye tracking software to determine where the user is looking. If the device being used to present the content 606 is a headset, the camera may be disposed on the headset at an orientation to gather images of the user's eyes. If the device being used to present the content 606 is a handset, the camera may be a camera on the handset that can gather images of the user's eyes when the camera is directed toward the user's eyes. However, note that in other embodiments the content 606 may be presented adjacent to the handle 608 based on the handle 608 being identified as the portion of the cup 604 to be or already being physically engaged by the user, regardless of the orientation of the user's eyes as looking toward the handle 608 (or cup 604 more generally) or elsewhere.

Still further, note more generally that in embodiments where a user is already physically engaging an object when a determination is made by the device that content is to be presented, the device may simply select the portion of the object that is identified as being physically engaged as the portion adjacent to which the content should be presented. However, in other embodiments where, for example, the user is looking at the object and the device accordingly identifies the object as the user's attention center but where the user has yet to physically engaged the object, a relational database linking objects to corresponding portions of those objects to be physically by a user may be accessed to look up the identified object and then identify the corresponding portion to be physically engaged. Additionally, or alternatively, artificial intelligence may also be used to determine a portion of the object most likely to be physically engaged as might be identified based on a history of past instances of physical engagement to which the artificial intelligence software might have access.

Still in reference to FIG. 6, as for presentation of the content 606, note that in embodiments where the device being used is a handset, assume a camera feed of the user's environment is presented on the handset's display and assume the content 606 is to be presented on the same display. The content 606 may be presented using AR or VR software so that the content 606 is presented at a display location adjacent to where the handle 608 is represented on the at least one display via the camera feed.

However, should the device being used instead be a headset that is worn by the user, the content 606 may be presented using AR or VR software so that the content 606 is presented on the headset's display at a display location adjacent to where the user's line of sight to the handle 608 would intersect the display should the user look at the handle 608 using the headset's display (in a VR embodiment) or through the display (in an AR embodiment) even if the user is not currently doing so.

Figure 7:
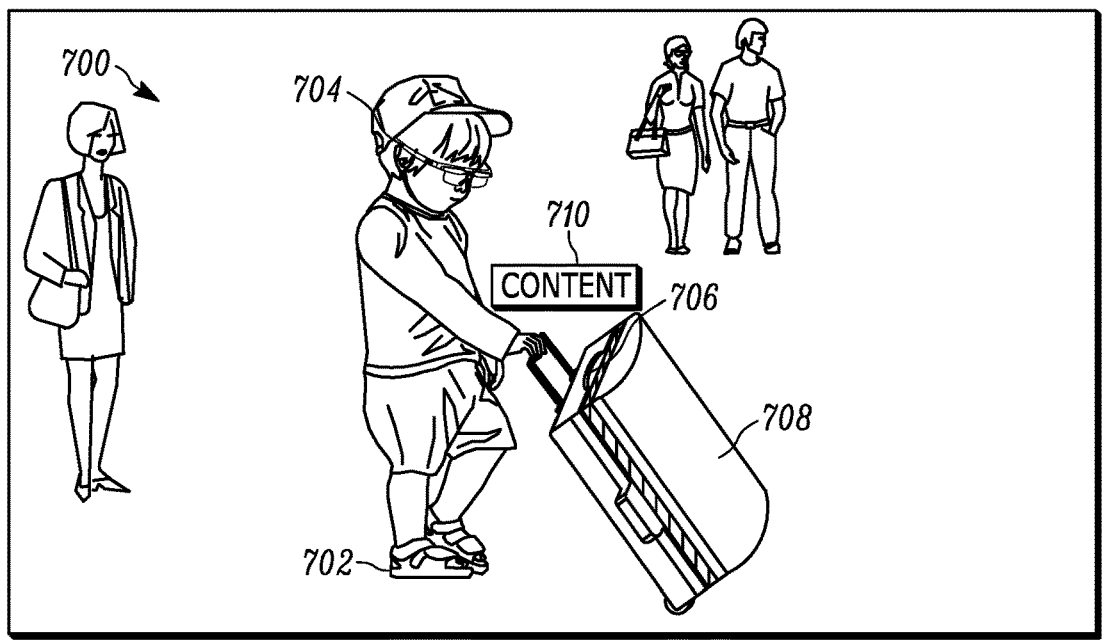
Figure 8:
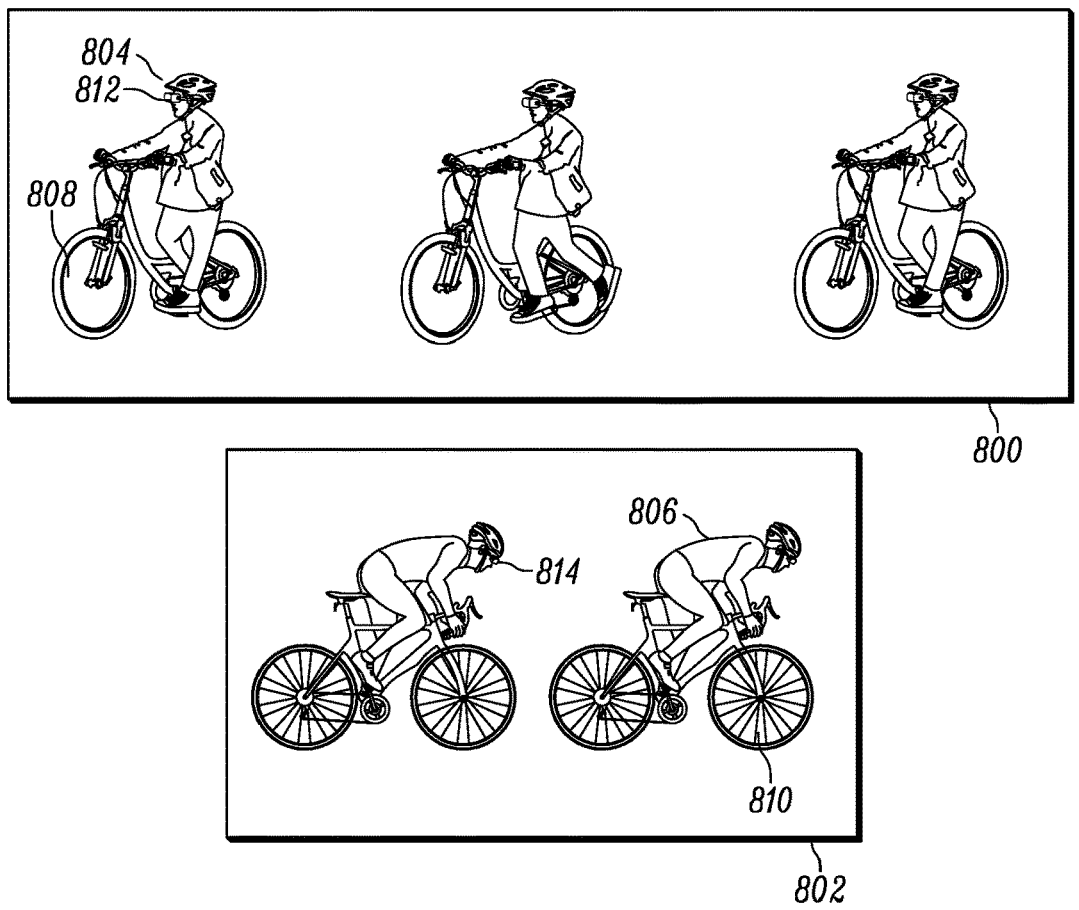

Additional examples of an attention center determined by where a user might physically engage a portion of an object are shown in FIGS. 7 and 8. In the illustration 700 shown in FIG. 7, a child 702 wearing an AR headset 704 is looking at and physically engaging a handle 706 of a suitcase 708. Accordingly, content 710 is presented within a threshold distance of the handle 706 but not overtop of the handle 706 so that the content 710 does not obstruct the child's view of the handle 706.

In the illustrations 800, 802 shown in FIG. 8, respective users 804, 806 are shown at various stages of mounting respective bicycles 808, 810. The handlebars of the respective bicycles may be identified as the attention center of the respective users 804, 806, and accordingly respective content 812, 814 may be presented above the handlebars within a threshold non-zero distance of the handlebars.

Additionally, it is to be understood that in at least some instances, gender and age may play a role in mounting and dismounting the bicycle. For instance, an elderly man may mount a bicycle by lifting one leg over the frame of the bicycle in front of the seat while a younger woman may mount a bicycle by lifting one leg over the frame of the bicycle behind the seat. In this case, where the man or woman might be looking to stabilizing himself or herself while mounting the bicycle may be determined to be the attention center of that person, and hence content may be presented adjacent to the attention center.

Figure 9:
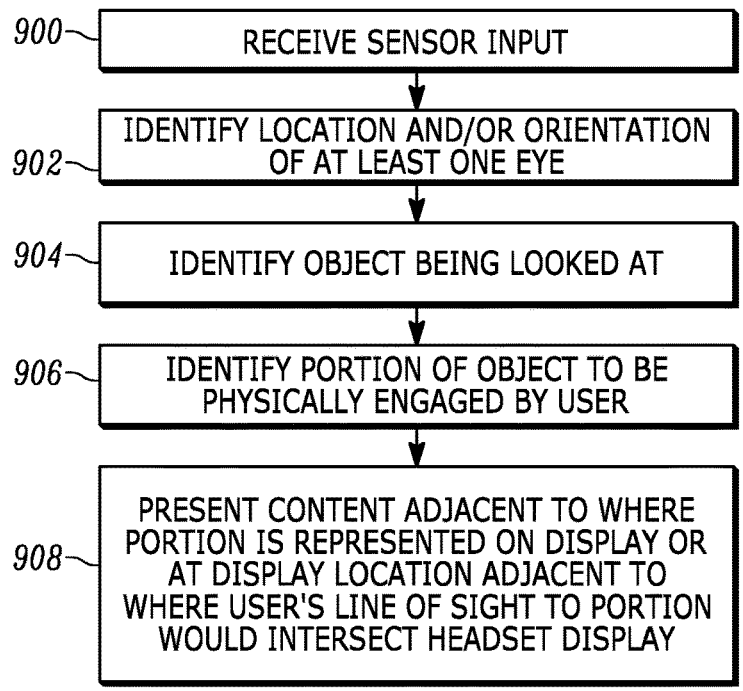

FIG. 9 shows example logic that may be executed by a device in accordance with the embodiments of FIGS. 6-8 described above. Note that while FIG. 9 illustrates the logic in flow chart format, state logic or other equivalent logic may be used. In any case, the logic of FIG. 9 starts at block 900 where the device may receive input from a sensor, such as a camera. From block 900 the logic may then proceed to block 902 where the device may identify a location and/or orientation of one or more eyes of the user using eye tracking software and images from the sensor received at block 900.

From block 902 the logic may then proceed to block 904 where the device may identify an object being looked at by the user by identifying an object toward which the user is looking based on the eye tracking software and then identifying the object using object recognition software. Thereafter the logic may proceed to block 906 where the device may identify a portion of the object being or to be physically engaged by the user as set forth herein.

From there the logic of FIG. 9 may proceed to block 908 where the device may present content adjacent to where the portion of the object is represented on the device's display or where the portion is viewable through the device's display (e.g., if device were smart glasses and its display were at least partially transparent for presenting AR images thereon) as described herein.

Figure 10:
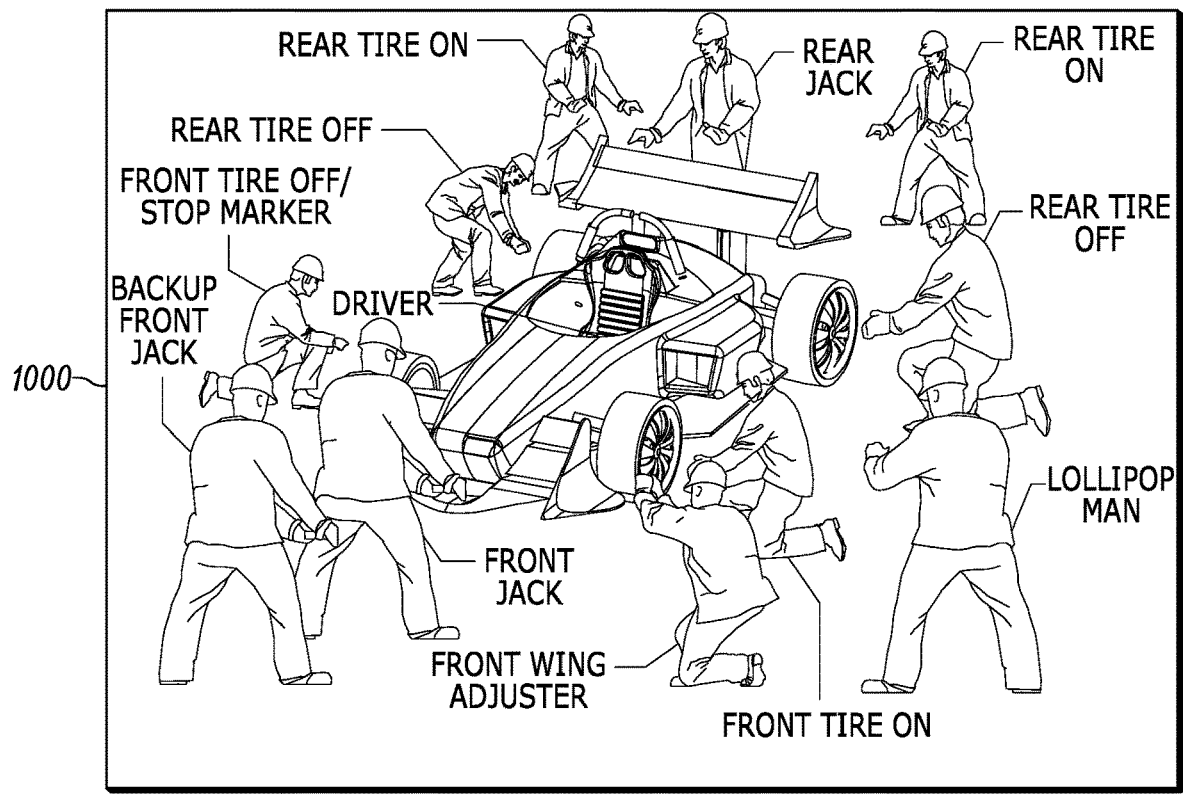

Continuing now in reference to FIG. 10, it shows yet another example illustration 1000 in accordance with present principles. The illustration 1000 depicts various members of a racecar pit crew. Text is overlaid on the various members that are shown to illustrate the various assigned roles or tasks to which they have been respectively assigned. This text may or may not actually be presented on the display of other respective users when viewing the member using a display of a handset or through a transparent display of a headset.

Thus, it is to be understood that each member of the pit crew may have an at least partially transparent display integrated into the helmet he/she is shown as wearing so that he/she can view content on the display while also viewing the real world around him/her through it. Each display may also be in communication with a respective device for the respective pit crew member, with the device having access to data indicating the respective pit crew member's assigned role or task. The data itself may have been established and stored by a leader of the pit crew or another person. Based on the data indicating the assigned role or task, the respective devices may then control their respective displays to present content near the attention center for the respective member based on respective items that are determined to be of relevance to the member based on the member's respective role or task (e.g., as determined based data in a relational database associating various roles/tasks with respective items/objects).

For example, for a member having an assigned role of "front jack operator", content may be presented adjacent to the front jack he or she is operating, within a threshold distance of a handle of the jack or where the jack physically engages the race car depending on which portion of the jack the device determines to be the attention center. As another example, for a member having an assigned role of "front tire on", content may be presented adjacent to the tire he or she is to place on the race car after an old tire is removed, within a threshold distance of the tire to be placed on the race car.

Thus, depending on the respective pit crew member's assign role, content may be presented so as to appear adjacent to a respective object that is involved in whatever the crew member's task might be, regardless of the current hand position of that member or where that member might be looking. However, head orientation may still be identified and used in some embodiments, as might be determined based on camera input, gyroscope and accelerometer input, etc., so that the member's field of view may be determined based on the input. Then, for example, if multiple objects might be of relevance to the member but only one of those objects is currently within the member's field of view based on the member's current head orientation, content may then be presented adjacent to the object of relevance in that field of view rather than, e.g., being "anchored" to an object not in the member's field of view.

Figure 11:
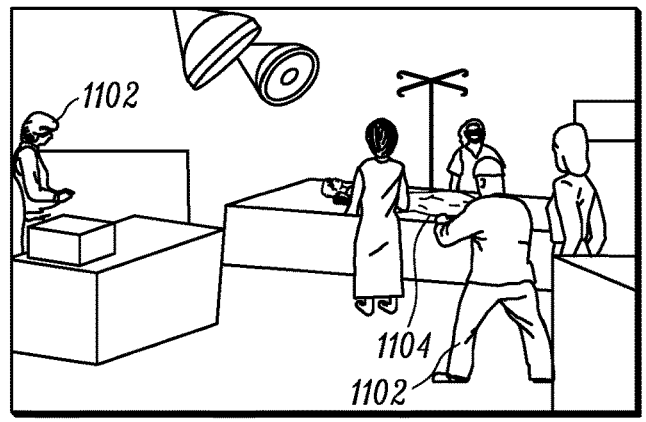

FIG. 11 shows another illustration 1100 in which various people may have different assigned roles and tasks, and hence may be presented with various pieces of content adjacent to objects associated with their respective roles or tasks. As may be appreciated from FIG. 11, an operating room is depicted in which numerous health care professionals 1102 are helping operate on a patient 1104. Each health care professional may be wearing his or her own respective headset so that content may be presented adjacent to an object of relevance to him/her based on his/her assigned role. For example, a video feed from a camera on the end of an endoscope inside the patient 1104 may be presented on a medical doctor's headset adjacent to the handle of the endoscope that is outside the body of the patient 1104, while different content such as text instructions to assist the doctor may be presented on a nurse's headset adjacent to the handle of a light being used by the nurse to illuminate a portion of the patient 1104 being operated on by the doctor. Thus, in this example the roles would be doctor and nurse, whereas the tasks would be operating on the patient and assisting the doctor, respectively.

Note that the foregoing principles from FIGS. 10 and 11 may also be applied to handset embodiments as well so that, for example, rather than presenting the content on an at least partially transparent display at a display location adjacent to where the respective user's line of sight to the object would intersect the at least partially transparent display should the user look at the object through the at least partially transparent display, content may instead be presented on the handset's display at a display location adjacent to where the object is represented on the handset's display via a video feed or otherwise.

Figure 12:
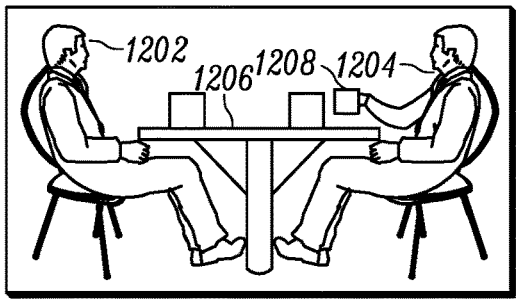
Figure 12:
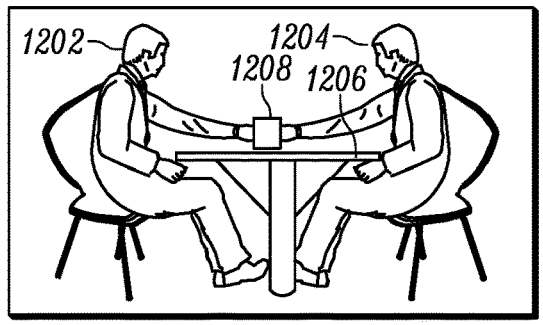
Figure 12:
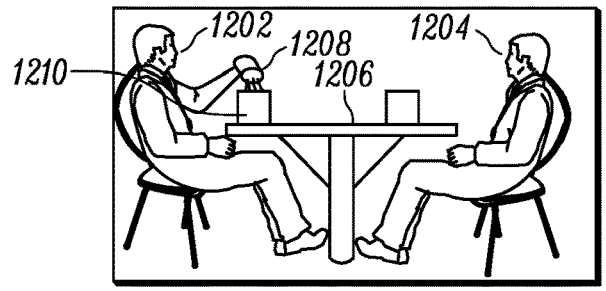

Now referring to FIG. 12, another example illustration 1200 is shown, with the illustration 1200 indicating various actions of two users 1202, 1204 while sitting at a table 1206 having a conversation with each other. At stage one as depicted on the left, user "A" (i.e. user 1204) picks up and holds a container of milk 1208. Then at stage two as depicted in the center, user "A" gives the container of milk 1208 to user "B" (i.e. user 1202). Then at stage three as depicted on the right, user "B" pours milk from the container of milk 1208 into a cup 1210.

With the illustration 1200 in mind, it is to be understood that an artificial intelligence-based classification may be used in some embodiments using a type-specifying disposition. For example, artificial intelligence may be used to identify and prioritize certain types of actions or behavior that a user might perform with respect to an object, such as the container of milk 1208. Thus, the artificial intelligence system can detect, classify, and/or monitor multiple tasks and potential tasks performed within the field of view of the artificial intelligence system (e.g., within the field of view of a camera providing an image feed to the artificial intelligence system). The artificial intelligence system can then prioritize the tasks in order of likelihood to be performed based on which one task is likely to have the most relevance to a user and hence draw the user's attention. The artificial intelligence may also predict the most-likely task a user is to perform based on motor preparation (e.g., beginning to move a hand) and an item at a different location being looked at by the user to identify an intended task the user is about to perform ahead of the current position of the hand and hence a location at which content should be presented on a display so that it appears adjacent to where the intended task is predicted to be performed.

Moreover, if the artificial intelligence system has recorded previous events of a similar or same nature, the artificial intelligence system's confidence may be high once a given pattern on the part of the user begins to emerge again. However, if the artificial intelligence system's confidence is below a threshold confidence level, content may not be presented adjacent to the location where the intended task is predicted to be performed. In such an instance where the artificial intelligence system's confidence in a certain prediction is below the threshold confidence level, content may be presented at a default display location or at another location determined based on one or more of the other methods described herein.

So, for example, if the artificial intelligence system identifies user "A" holding the container of milk 1208 at stage one or giving the milk to user "B" at stage two, and it predicts with sufficient confidence that B will then pour milk from the container 1208 into the cup 1210, the artificial intelligence system may be used to present content on user "B" 's transparent headset display so that it appears disposed to the right of the cup 1210 before user "B" even receives the container 1208 from user "A" and/or begins pouring milk from the container 1208 into the cup 1210. Thus, the cup 1210 is predicted to be the attention center in this example, even before user "B" looks at the cup 1210 to pour milk from the container 1208.

Figure 13:
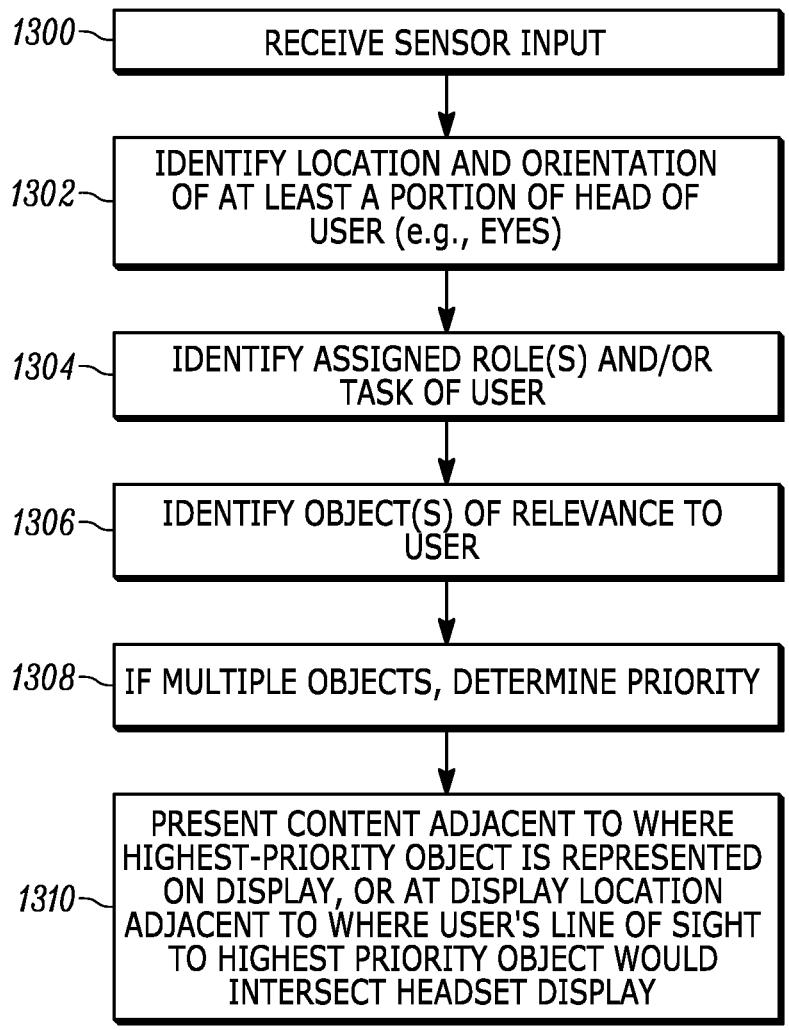

Referring now to FIG. 13, it shows example logic that may be executed by a device in accordance with the embodiments of FIGS. 10-12 described above. Note that while FIG. 13 illustrates the logic in flow chart format, state logic or other equivalent logic may be used. In any case, the logic of FIG. 13 starts at block 1300 where the device may receive input from a sensor, such as a camera. From block 1300 the logic may then proceed to block 1302 where the device may identify a location and/or orientation of the user's head, such as the user's eyes or the head more generally, as may be determined based on the input received at block 1300 and/or where the tip of the user's nose is pointing.

From block 1302 the logic may then proceed to block 1304 where the device may identify assigned roles and/or tasks for the user as described herein. The logic may then proceed to block 1306 where the device may identify objects of relevance to the user based on the assigned roles/tasks. Then at block 1308 the device may establish a priority for which object proximate to a user is most likely to be acted upon, e.g., using artificial intelligence software as described above.

From block 1308 the logic may then proceed to block 1310. At block 1310 the logic may present content at a display location adjacent to where the portion of the highest-priority or relevant object is represented on the device's display or where the highest-priority or relevant object is viewable through the device's display (e.g., if device were an AR headset and its display were at least partially transparent for presenting AR images thereon) as described herein.

FIG. 14 will now be described. It shows an example graphical user interface (GUI) 1400 presentable on a display for configuring settings of a device or application undertaking present principles. Each of the options to be described below may be selected by selecting the respective check box shown adjacent to the respective option using, e.g., touch input, cursor input, a verbal command selecting the option, etc.

Beginning with option 1402, it may be selected to enable the device or application to present content adjacent to an attention center as disclosed herein. Thus, option 1402 may be selected to enable the device or application to undertake any or all functions described above in reference to FIGS. 3-13.

The GUI 1400 may also include various options related to particular modes of determining a user's attention center. Thus, option 1404 may be selected to use hand position and/or movement as described herein, option 1406 may be selected to use nose and/or head orientation as disclosed herein, and option 1408 may be selected to use eye position and/or gaze as described herein. Still further, option 1410 may be selected to use a portion of an object being touched or physically engaged by a user as described herein while option 1412 may be selected to use an object's determined relevance or a user's assigned roles/tasks as described herein.

As shown on the GUI 1400, a currently-set role for a given user may also be indicated on the GUI 1400 via text 1414. In the example shown, the text 1414 indicates that a doctor role has been assigned to the user to which the GUI 1400 pertains. A selector 1416 may also be selected to add or modify one or more of the assigned roles/tasks via another GUI that may be presented for doing so.

Thus, it may now be appreciated based on the foregoing detailed description that a user may be able to more quickly and easily discern content presented on the display of a device using present principles, all while the content does not interfere with or obstruct the user's actions or objects being acted upon owing to the content being presented adjacent to but not at the location of the user's actions and/or relevant objects or object portions. This may be done through detection & recognition of detection/attention centers as disclosed herein.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
   at least one processor;
   at least one at least partially transparent display accessible to the at least one processor; and
   storage accessible to the at least one processor and comprising instructions executable by the at least one processor to:
   identify a handle of an object, the handle establishing a part of the object but not all of the object, the object being different from the headset;
   identify a trajectory of a hand of a user as the hand moves from a first position to a second position, the second position being established by a current location of the handle, the object being different from the user; and
   based on the identifications, present content on the at least one at least partially transparent display at a display location adjacent to where the user's line of sight to the handle intersects the at least one at least partially transparent display.

2. The headset of claim 1, wherein the headset uses augmented reality software to present the content.

3. The headset of claim 1, wherein the instructions are executable to:
   identify a first hand of the user as being located on an underside of a device;
   identify a second hand of the user as being located on the underside of the device, the second hand being different form the first hand; and
   based on both identifications, present content on the at least one at least partially transparent display at a first display location that is equidistant to a second display location where the user's line of sight to the first hand intersects the at least one at least partially transparent display and to a third display location where the user's line of sight to the second hand intersects the at least one at least partially transparent display.

4. The headset of claim 1, wherein adjacent comprises no more than a threshold distance away from where the user's line of sight to the handle intersects the at least one at least partially transparent display.

5. The headset of claim 1, wherein the instructions are executable to:
present a settings graphical user interface (GUI) on the at least one at least partially transparent display, the GUI being usable to configure one or more settings of the headset, the GUI comprising an option that is selectable a single time to set the headset to subsequently perform the identifications in plural future respective instances of hand movement toward handles.

6. The headset of claim 1, comprising a camera, wherein the instructions are executable to:
identify, based on input from the camera, the handle of the object and the trajectory of the hand.

7. A computer-implemented method, comprising:
identifying a handle of an object, the handle establishing a part of the object but not all of the object; and
based on the identification, presenting content on a display of an electronic device at a display location adjacent to where a user's line of sight to the handle intersects the display, the electronic device being different from the object, the user being different from the object;
wherein the electronic device comprises a headset, and wherein the display comprises an at least partially transparent display through which the user can view real-world objects while wearing the headset.

8. The computer-implemented method of claim 7, wherein the electronic device uses augmented reality software to present the content.

9. The computer-implemented method of claim 7, comprising:
identifying a first hand of the user as being located on an underside of a hand-held display;
identifying a second hand of the user as being located on the underside of the hand-held display, the second hand being different form the first hand; and
based on both identifications, presenting content on the at least partially transparent display at a first display location that is equidistant to a second display location where the user's line of sight to the first hand intersects the at least partially transparent display and to a third display location where the user's line of sight to the second hand intersects the at least partially transparent display.

10. The computer-implemented method of claim 9, wherein adjacent comprises no more than a threshold distance away from where the user's line of sight to the handle intersects the display.

11. The computer-implemented method of claim 7, comprising:
presenting a settings graphical user interface (GUI) on the display, the GUI being usable to configure one or more settings of the electronic device, the GUI comprising an option that is selectable a single time to set the electronic device to subsequently perform the identification and presentation steps in plural respective future instances.

12. The computer-implemented method of claim 7, comprising:
identifying a trajectory of a hand of the user as the hand moves from a first position to a second position, the second position being established by a current location of the handle; and
based on both of the identifications, presenting the content on the display at the display location adjacent to where the user's line of sight to the handle intersects the display.

13. A computer readable storage medium (CRSM) that is not a transitory signal, the computer readable storage medium comprising instructions executable by at least one processor to:
identify a handle of an object, the handle establishing a part of the object but not all of the object; and
based on the identification, present content on a display of an electronic device at a display location adjacent to where a user's line of sight to the handle intersects the display, the electronic device being different from the object, the user being different from the object;
wherein the electronic device comprises a headset, and wherein the display comprises an at least partially transparent display through which the user can view real-world objects while wearing the headset.

14. The CRSM of claim 13, comprising the electronic device.

15. The CRSM of claim 13, wherein the instructions are executable to:
identify a first hand of the user on an underside of a hand-held display;
identify a second hand of the user on the underside of the hand-held display, the second hand being different form the first hand; and
based on both identifications, present content on the at least partially transparent display at a first display location that is equidistant to a second display location where the user's line of sight to the first hand intersects the at least partially transparent display and to a third display location where the user's line of sight to the second hand intersects the at least partially transparent display.

16. The CRSM of claim 13, wherein the instructions are executable to:
identify a trajectory of a hand of the user as the hand moves from a first position to a second position, the second position being established by a current location of the handle, the object being different from the user; and
based on both identifications, present the content on the display at the display location.

17. The CRSM of claim 13, wherein the instructions are executable to:
present a settings graphical user interface (GUI) on the display, the GUI being usable to configure one or more settings of the electronic device, the GUI comprising an option that is selectable a single time to set the electronic device to subsequently perform the identification and presentation steps in plural respective future instances.

18. The CRSM of claim 13, wherein adjacent comprises no more than a threshold distance away from where the user's line of sight to the second position intersects the display.

19. The CRSM of claim 13, comprising the at least one processor.

20. The CRSM of claim 13, comprising the object.

\* \* \* \* \*